(12) United States Patent
Park

(10) Patent No.: US 6,870,303 B2
(45) Date of Patent: Mar. 22, 2005

(54) MULTI-MODE VIBRATION DAMPING DEVICE AND METHOD USING NEGATIVE CAPACITANCE SHUNT CIRCUITS

(75) Inventor: Chul-hue Park, Pohang (KR)

(73) Assignee: Pohang University of Science and Technology Foundation, Kyungsangbuk-Do (KR)

( * ) Notice: Subject to any disclaimer, the term of this patent is extended or adjusted under 35 U.S.C. 154(b) by 151 days.

(21) Appl. No.: 10/428,782

(22) Filed: May 5, 2003

(65) Prior Publication Data

US 2003/0209953 A1 Nov. 13, 2003

(30) Foreign Application Priority Data

May 8, 2002 (KR) .............................. 10-2002-0025397
Jun. 21, 2002 (KR) .............................. 10-2002-0034881

(51) Int. Cl.[7] ............................................. H01L 41/08
(52) U.S. Cl. ...................... 310/319; 310/339; 310/314
(58) Field of Search ..................... 310/314, 317–319, 310/339

(56) References Cited

U.S. PATENT DOCUMENTS

| 2,212,840 | A | * | 8/1940 | Mason ........................ 310/314 |
| 3,881,134 | A | * | 4/1975 | Thanawala .................... 317/53 |
| 4,021,762 | A | * | 5/1977 | Jaki ............................ 333/72 |
| 4,158,787 | A | * | 6/1979 | Forward ....................... 310/51 |
| 5,783,898 | A | * | 7/1998 | Wu ........................ 310/316.01 |
| 6,060,813 | A | * | 5/2000 | Nowak ....................... 310/314 |
| 6,075,309 | A | * | 6/2000 | Wu ............................. 310/319 |
| 6,138,996 | A | * | 10/2000 | Hayashi et al. ............. 267/136 |
| 6,310,746 | B1 | * | 10/2001 | Hawwa et al. ........... 360/97.01 |
| 6,486,589 | B1 | * | 11/2002 | Dujari et al. ................ 310/331 |
| 6,563,250 | B2 | * | 5/2003 | Mathur .................. 310/316.01 |
| 2003/0057807 | A1 | * | 3/2003 | Fleming et al. ............. 310/326 |

FOREIGN PATENT DOCUMENTS

| EP | 0715092 A2 | * | 6/1996 | ............ F16F/15/00 |
| JP | 2000-070933 | * | 3/2002 | ............ F16F/15/02 |

* cited by examiner

Primary Examiner—Thomas M. Dougherty
(74) Attorney, Agent, or Firm—Leydig, Voit & Mayer, Ltd.

(57) ABSTRACT

A novel multi-mode vibration damper is invented by using a pair of piezoelectric patches connected with negative capacitance shunt circuit units. A piezoelectric material connected with a series resistor-negative capacitor branch circuit is capable of suppressing the vibration and/or noise amplitudes in the low frequency range. The other piezoelectric material connected with a parallel resistor-negative capacitor circuit is for suppressing the vibration and/or noise amplitudes in the high frequency range. By combining two negative capacitance shunt circuit units, a multi-mode vibration damper is capable of suppressing the whole structure modes simultaneously. In order to describe the characteristic behaviors of a multi-mode vibration damper, the stiffness ratio and loss factor with respect to the non-dimensional frequency are considered. The mechanism of a shunt damper is also described as considering a shunt voltage generated by the shunt impedance. The example results show that the multi-mode vibration damper reduces the vibration amplitudes of the vibrating system significantly across a broadband frequency range.

5 Claims, 7 Drawing Sheets

US 6,870,303 B2

MULTI-MODE VIBRATION DAMPING DEVICE AND METHOD USING NEGATIVE CAPACITANCE SHUNT CIRCUITS

This application claims the priority of Korean Patent Application No. 2002-25397, filed on May 8, 2002 and No. 2002-34881, filed on Jun. 21, 2002 in the Korean Intellectual Property Office, which are incorporated herein in their entirety by reference.

FIELD OF THE INVENTION

The present invention relates to a multi-mode vibration damping device and method to suppress the multimode vibration and/or noise amplitudes by using piezoelectric materials and negative capacitance shunt circuits.

BACKGROUND OF INVENTION

Vibration suppression via piezoelectric shunt circuits has been of popular interest in recent years due to lightweight, ease of use, and good performance. Among the shunt devices that have been widely used are the resistive and inductive shunt circuits. However, these devices have, so far, been limited to control of a single vibration mode by matching the electrical resonance of the shunting device with the mechanical resonance of the vibrating structure or system.

The external terminals of a piezoelectric material, modeled as a capacitor (since, its electrical property is dominantly capacitance) are connected to the shunt branch circuit. The piezoelectric element is used to convert mechanical energy of the vibrating structure or system to electrical energy by direct piezoelectric effect. The electric energy is dissipated as heat through the shunt resistor efficiently when the electrical resonant frequency matches the targeted mechanical resonant frequency.

Many efforts have been made to develop a multi-mode structural vibration control device using inductive shunt circuit. For example, a theory was developed for suppressing multiple vibration modes by using a single piezoelectric material coupled with a multi-mode shunt network. Another example is a blocking circuit for filtering unwanted current frequencies. However, the conventional multi-mode vibration damper using a shunt circuit has a drawback in that it only provides damping of vibration in the limited frequency range.

A common factor in nature between a negative capacitance shunt circuit and an inductive resonant shunt circuit is that they have the same phase angle (90°). The magnitude of a negative capacitance in a negative capacitance shunt circuit should be equal or near as that of an inherent capacitance of piezoelectric material. Therefore, the negative capacitance circuit provides a negative capacitance of a magnitude that cancels the internal capacitance of a piezoelectric material in order to produce the maximum vibration damping capability.

Applying the above facts, a new multiple-mode vibration damper is invented by using negative capacitance shunting; one is connected two terminals of piezoelectric material to a resistor-negative capacitor shunt branch circuit in series, the other is connected with it in parallel. A piezo patch attached on the vibrating structure or system with a series resistor-negative capacitance shunting is designed to control the vibration and/or noise amplitudes in the low frequency range. The other patch bonded below the vibrating structure or system with a parallel resistor-negative capacitance shunting is for suppressing vibration modes in the high frequency range.

SUMMARY OF THE INVENTION

The present invention provides a novel shunt circuit, which has a capability to suppress multimode vibration and/or noise amplitudes by using a pair of piezoceramic patches. A piezo patch attached on the structure with a series resistor-negative capacitor shunt circuit is designed to control the vibration amplitudes in the low frequency range. The other patch bonded below the structure with a parallel resistor-negative capacitor shunt circuit is for suppressing vibration modes in the high frequency range. In order to describe the characteristic behaviors of piezoelectric damper connected with a series and a parallel resistor-negative capacitor branch circuit, the stiffness ratio and loss factor with respect to the non-dimensional frequency are considered. The mechanism of a piezoelectric shunted circuit is also described as considering a shunt voltage generated by the shunt impedance. Thus, the piezo patches attached on the vibrating system with combined a series and a parallel resistor-negative capacitor branch circuit can significantly reduce multi-mode vibration amplitudes simultaneously across a broad frequency band. Hence, the negative capacitance shunt circuit according to the present invention establishes an invaluable tool as a multimode vibration damper in many engineering applications.

DESCRIPTION OF ILLUSTRATIVE EMBODIMENTS

A multi-mode vibration damper using negative capacitance shunt circuits according to the present invention will now be described more fully with reference to the accompanying drawings.

Figure 1:
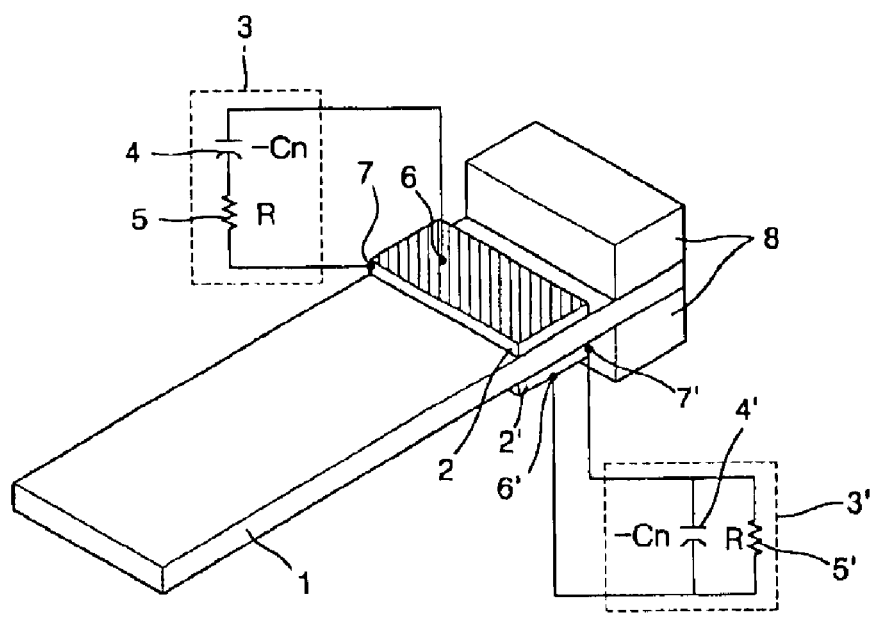
FIG. 1 is a schematic drawing of the shunted piezo/beam system with negative capacitance shunt circuits.

Referring to FIG. 1, the multi-mode vibration damper using the negative capacitance shunt circuits according to the present invention is formed of a beam 1, which generates vibration and/or noise by receiving mechanical energy, such as force, pressure, and stress; an upper piezoelectric material 2, which is attached on the beam 1, for generating electric energy, such as voltage and current, when receiving stress due to the vibration and/or noise, and for transforming its shape when receiving a predetermined electric energy; and a series shunt circuit unit 3, which is connected to two terminals of the upper piezoelectric material 2, for feeding back the electric energy generated by the upper piezoelectric material 2 to the upper piezoelectric material 2 via the shunt impedance to induce the transformation of the upper piezoelectric material 2. Here, the series shunt circuit unit 3 is formed by connecting a resistor 5 and a negative capacitor 4 in series, in order to control vibration amplitudes in a low frequency range. The multi-mode vibration damper according to the present invention also includes a lower piezoelectric material 2' attached to the lower portion of the beam 1, and a parallel shunt circuit unit 3', which is connected to two terminals of the lower piezoelectric material 2' and includes a resistor 5' and a negative capacitor 4' connected in parallel. Here, the parallel shunt circuit unit 3' preferably controls the vibration amplitudes in the high frequency range. Reference numeral 8 denotes a base of the beam 1. In the present invention, the upper piezoelectric material 2 is attached to a portion of the beam 1 and separated from the base 8 by 0.1 cm. The piezoelectric materials 2 and 2' having polarities in a thickness direction extend in a lengthwise direction to be performed on a traverse direction mode. The operations of the shunt circuit units 3 and 3' as a vibration and/or noise damper will be described later.

Figure 3:
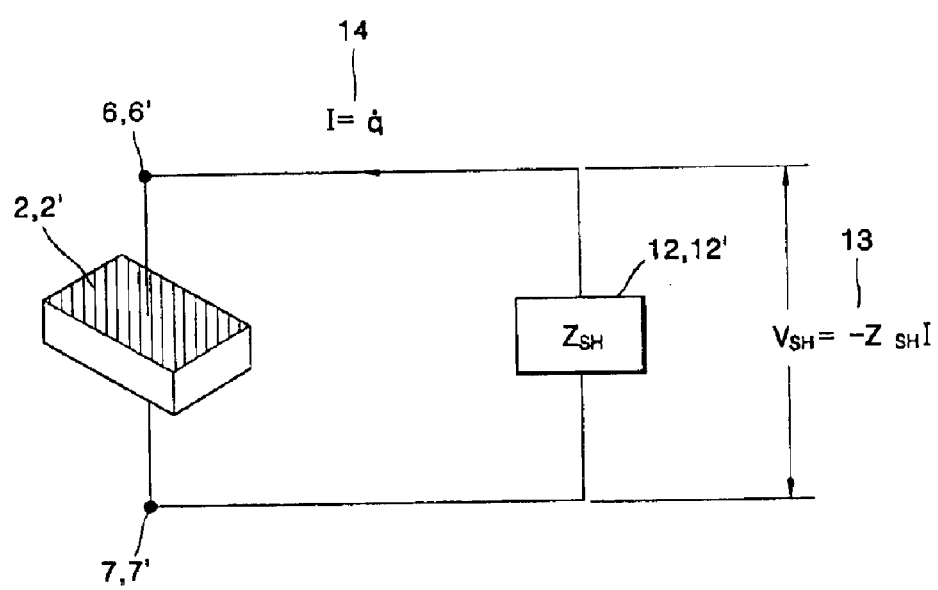
FIG. 3 is a block diagram illustrating the feedback current into a piezoelectric material due to shunt impedance according to the present invention.

The negative capacitance 4 of FIG. 1 can be substituted by a synthetic negative impedance circuit unit 18, which is formed of an operational amplifier 19 driven by a predetermined voltage, for example, plus or minus 15 V, a capacitor 15 connected between the positive input terminal and the output terminal of the operational amplifier 19, a resistor 16 having a resistance of (1-a)R connected between the inverting terminal and the output terminal of the operational amplifier 19, and a resistor 17 having a common contact with the inverting input terminal of the operational amplifier 19 and the resistor 16, as shown in FIG. 3.71(a), pp. 96&97, of the handbook *Applications Manual for Computing Amplifiers for Modeling, Measuring, Manipulating & Much Else*, published in 1965 by Philbrick researches, Inc., Nimord Press Inc., Boston, Mass. The resistor 17 has a resistance of aR. The synthetic negative impedance circuit unit 18 preferably has the equal or near magnitude as that of the internal capacitance of piezoelectric material 9 and an opposite phase angle from that of the internal capacitance of the piezoelectric material 9. In addition, the resistor 16 having the resistance of (1-a)R and the resistor 17 having the resistance of aR are in a reverse proportional relationship.

Figure 4A:
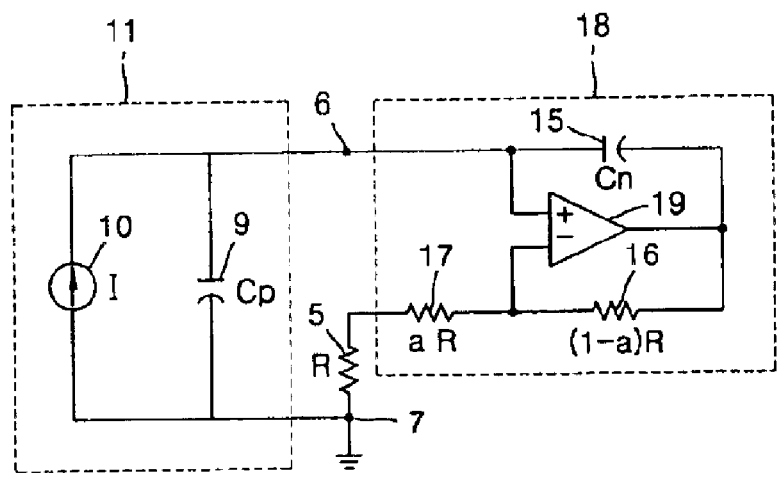
FIGS. 4A and 4B are circuit diagrams illustrating the connection of a synthetic negative impedance circuit unit to a shunt resistor in series and in parallel according to the present invention.
Figure 4B:
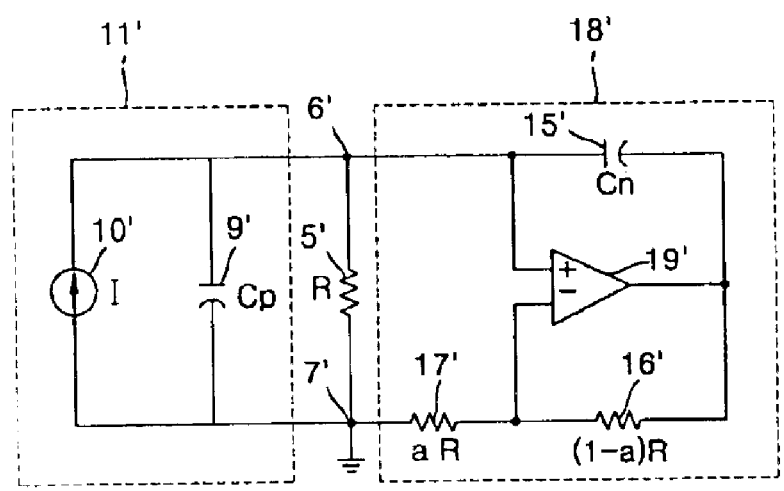

In the same manner, the negative capacitance 4' connected to the lower piezoelectric material 2' in FIG. 1 can be substituted by a synthetic negative impedance circuit unit 18'. Here, the synthetic negative impedance circuit unit 18' is formed of an operational amplifier 19' driven by a predetermined voltage, for example, plus or minus 15 V, a capacitor 15' connected between the positive input terminal and the output terminal of the operational amplifier 19', a resistor 16' having a resistance of (1-a)R connected between the inverting terminal and the output terminal of the operational amplifier 19', and a resistor 17' having a common contact with the inverting input terminal of the operational amplifier 19' and the resistor 16', as shown in FIG. 4B. The resistor 17' has a resistance of aR. In this case, the synthetic negative impedance circuit unit 18' preferably has the equal or near magnitude as that of the internal capacitance of the piezoelectric material 9' and an opposite phase angle from that of the internal capacitance of the piezoelectric material 9'. In addition, the resistor 16' having the resistance of (1-a)R and the resistor 17' having the capacitance of aR are in a reverse proportional relationship.

The operation of the multi-mode vibration damper using the negative capacitance shunt circuit according to the present invention will now be described with reference to FIGS. 1 through 9.

Referring to FIG. 1, the upper piezoelectric material 2 is attached to the upper surface of the beam 1 and the lower piezoelectric material 2' is attached to the lower surface of the beam 1. The upper piezoelectric material 2 is connected to the series shunt circuit unit 3, in which the resistor 5 and the negative capacitor 4 are connected in series, and the lower piezoelectric material 2' is connected to the parallel shunt circuit unit 3', in which the resistor 5' and the negative capacitor 4' are connected in parallel. Here, when the beam 1 receives force or pressure, the piezoelectric materials 2 and 2' attached to the beam 1 receive stress. Accordingly, charges q are accumulated in the piezoelectric materials 2 and 2', and the accumulated charges flow to generate currents I 14 (refer to FIG. 3). Here, the currents I 14 are an input to the series shunt circuit unit 3 and the parallel shunt circuit unit 3', respectively, and a voltage $V_{SH}$ 13 applied to the shunt impedances $Z_{SH}$ 12 and 12' is fed back to the piezoelectric materials 2 and 2' via two electrode terminals 6, 6', 7, and 7'. It is well known that the shunt impedances $Z_{SH}$ 12 and 12' occur due to the resistors 5 and 5' and the negative capacitors 4 and 4', respectively.

When the feedback voltage $V_{SH}$ 13 is applied to the piezoelectric materials 2 and 2', the shapes of the piezoelectric materials 2 and 2' are transformed according to the characteristics of the piezoelectric materials 2 and 2' in order to control the vibration of the beam 1. In other words, when the feedback voltage $V_{SH}$ 13 is applied to the piezoelectric materials 2 and 2', the shapes of the piezoelectric materials 2 and 2' are transformed to affect the vibration of the beam 1. In this way, the piezoelectric materials 2 and 2' function as vibration dampers. In addition, the values of the resistors 5 and 5' and the negative capacitors 4 and 4' of the shunt impedances $Z_{SH}$ 12 and 12' for applying the feedback voltage $V_{SH}$ 13 to the piezoelectric materials 2 and 2' are controlled. Thus, the degree of the vibration and/or noise amplitudes can be controlled. Although conventional vibration dampers using shunt circuits, for example, a resistive shunt circuit in which consists of a resistor or a resonant shunt circuit in which consists of a resistor and an inductor, control a single vibration mode in a limited frequency band, the vibration damper according to the present invention has a capability of suppressing the multi-mode vibration amplitudes. In other words, the series resistor-negative capacitance shunt circuit unit 3 connected to two terminals of the upper piezoelectric material 2 on the beam 1 controls vibration amplitudes in a low frequency range, and the parallel resistor-negative capacitance shunt circuit unit 3' connected to two terminals of the lower piezoelectric material 2' under the beam 1 controls them in a high frequency range. Thus, the vibration damper according to the present invention uses the series and parallel resistor-negative capacitor shunt branch circuit units 3 and 3' to reduce multi-mode vibration amplitudes simultaneously over whole structural frequency range.

Figure 2A:
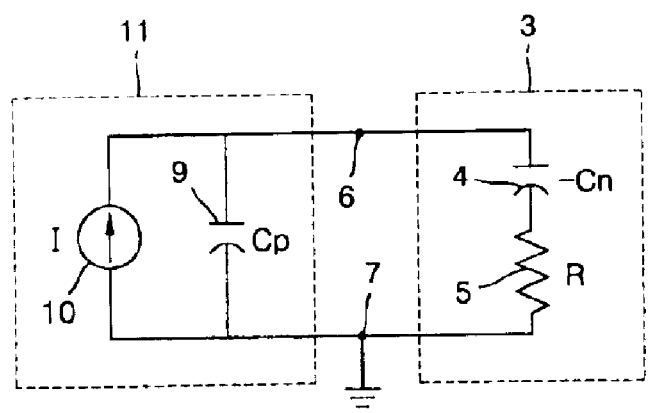
FIGS. 2A and 2B are circuit diagrams illustrating the connection of piezoelectric material with a series shunt circuit unit and a parallel shunt circuit unit according to the present invention.
Figure 2B:
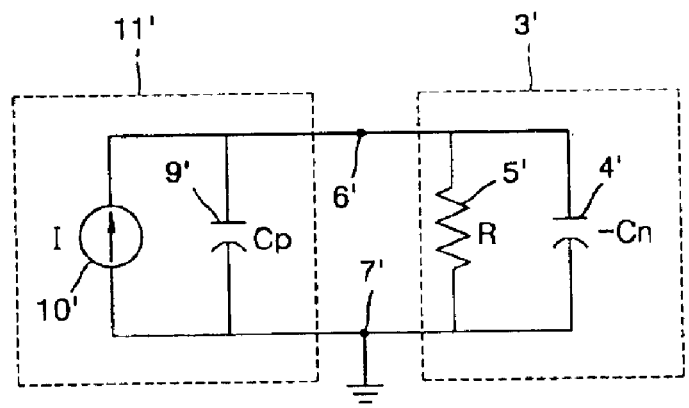

Due to the electrical characteristics of the piezoelectric materials 2 and 2', it is possible to model a circuit for the piezoelectric materials 11 and 11' as connecting current sources 10 and 10' with capacitances 9 and 9' in parallel, as shown in FIGS. 2A and 2B. In the modeling circuits of FIGS. 2A and 2B, the electrode terminals 6, 7, 6', and 7' are connected to the shunt circuit units 3 and 3', which include the resistors 5 and 5' and the negative capacitors 4 and 4', respectively. Here, states where the electrode terminals 6, 7, 6', and 7' are not connected are referred to as open circuit states. It is well known that current does not flow in the open circuit state.

In FIG. 3, the current I 14 generated in the piezoelectric materials 2 and 2' by the force or vibration applied to the beam 1 is fed back to the piezoelectric materials 2 and 2' via the shunt impedances $Z_{SH}$ 12 and 12'. As shown in FIG. 3, shunt voltages $V_{sub.SH}$ applied to the shunt impedances $Z_{SH}$ 12 and 12' are calculated using Equation 1.

$$V_{sub.SH} = -Z_{SH} \times I \tag{1}$$

On the other hand, the synthetic negative impedance circuit units 18 and 18' can be used to generate the magnitudes of negative capacitors, which are the equal or near as those of the internal capacitances 9 and 9' in the piezoelectric materials 2 and 2' and have opposite phase angles from those of the capacitances. Here, the synthetic negative impedance circuit units 18 and 18' are shown in FIGS. 4A and 4B.

The synthetic negative impedance circuits 18 and 18' are formed of capacitors 15 and 15', two resistors 16, 17, 16', and 17', and operational amplifiers 19 and 19', which are operated by providing plus or minus 15 V, respectively.

It is well known that the resistors 16, 17, 16', and 17' and the capacitors 15 and 15' in the synthetic negative impedance circuit units 18 and 18' should be controlled to prevent unstable states due to oscillations of a negative impedance. It is possible to match the capacitance $C_{sub.n}$ generated by the synthetic negative impedance circuit units 18 and 18' with the internal capacitance $C_{sub.p}$ of the piezoelectric materials 2 and 2' by controlling the parameter values of the resistors 16, 17, 16', and 17'. Since the resistors 17 and 17' of the synthetic negative impedance circuit units 18 and 18' are connected to the resistors 5 and 5' to form circuits such as the series and parallel resistor negative capacitance shunt circuit units 3 and 3' of FIGS. 2A and 2B, the shunt circuit units 3 and 3' are connected to the electrode terminals 6, 7, 6', and 7' of the piezoelectric materials 2 and 2'.

Figure 5:
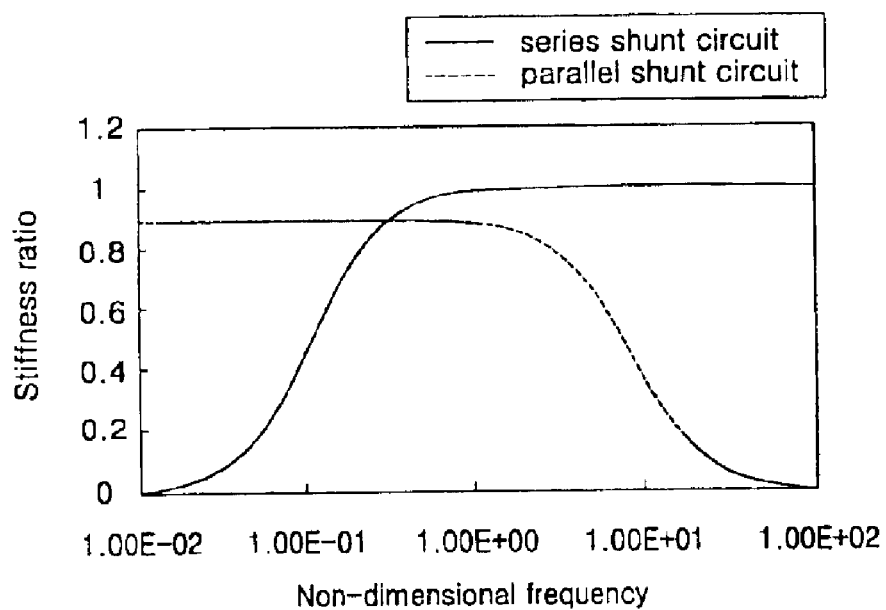
FIG. 5 is a graph illustrating stiffness ratios of series and parallel resistor-negative capacitance shunt circuit units according to the present invention.
Figure 6:
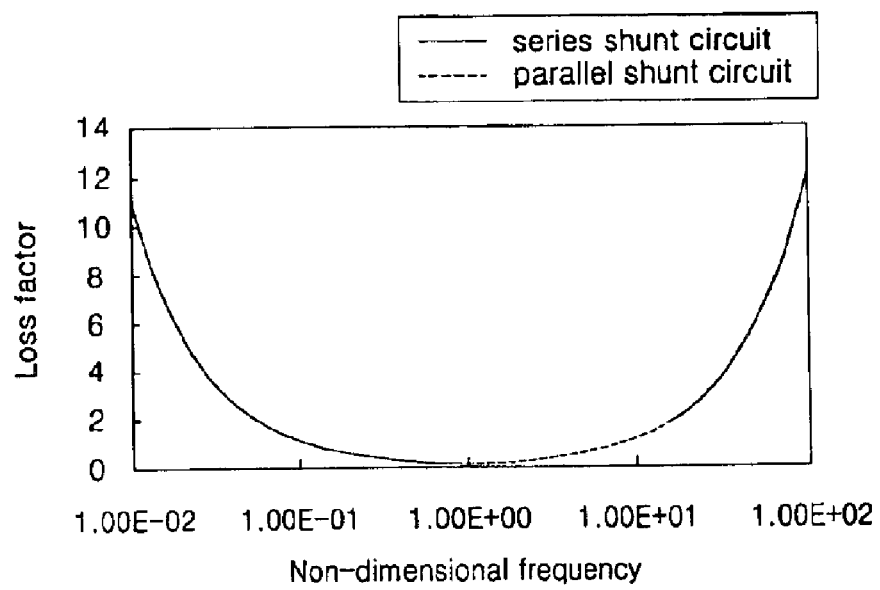
FIG. 6 is a graph illustrating loss factors of series and parallel resistor-negative capacitance shunt circuit units according to the present invention.

Referring to FIGS. 5 and 6, the stiffness ratios and the loss factors of the series and parallel shunt circuit units 3 and 3' with respect to non-dimensional frequencies are shown. The electromechanical coupling coefficient $K_{sub.ij}$ used in FIGS. 5 and 6 is 0.33. As shown in FIG. 5, as the non-dimensional frequency of the series shunt circuit unit 3 increases, the stiffness ratio increases from zero. Meanwhile, as the non-dimensional frequency of the parallel shunt circuit unit 3' increases, the stiffness ratio decreases to zero.

The electromechanical coupling coefficient $K_{sub.ij}$ has been used as a reference to measure the strength of the piezoelectric material. The coupling coefficient is defined as a ratio of stored mechanical energy to the total energy. An equation for seeking this coefficient when the stiffness factor approaches zero and the electromechanical coupling coefficient becomes unity is described by Lesieutre, G. and Davis, C., 1997, "Can a Coupling Coefficient of a Piezoelectric Device be Higher than Those of Its Active Materials", Proc. of SPIE, Vol. 3041, pp. 281–292. According to the equation, when the electromechanical coupling coefficient is one, the energy conversion rate between the mechanical energy and the electric energy is 100%. Accordingly, 100% of the mechanical energy in the low frequency range is converted into electrical energy and can be dissipated in the series negative capacitance shunt circuit 3. In a similar way, 100% of the mechanical energy in the high frequency range is converted into electrical energy and can be dissipated in the parallel negative capacitance shunt circuit 3' due to the stiffness factor being zero and the coupling coefficient being one.

Referring to FIG. 6, the material loss factor increases with increasing the non-dimensional frequency in the parallel shunt branch circuit unit 3' and decreases with increasing the non-dimensional frequency in the series shunt branch circuit unit 3. This fact shows that the parallel shunt branch circuit unit 3' can obtain more damping in high frequency range and the series shunt branch circuit 3 can do in low frequency range. Thus, according to the present invention, the negative capacitance shunt circuits make it possible to control multiple vibration modes across a broad frequency band.

Figure 7:
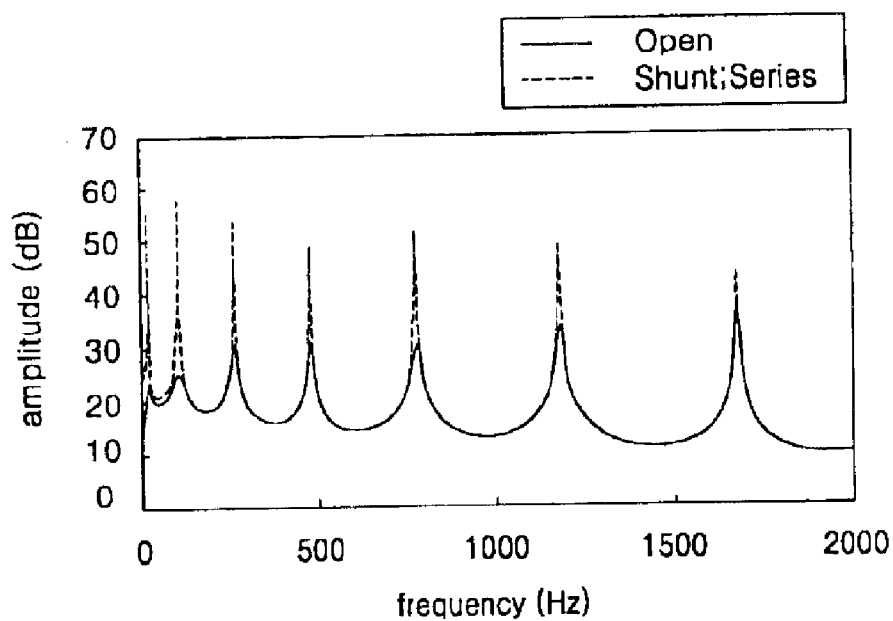
FIG. 7 is a graph illustrating a frequency response function when a series shunt circuit unit according to the present invention is operated and not operated.

FIG. 7 is a graph illustrating a frequency response function for the piezoelectric material/beam system to which the series negative capacitance shunt circuit unit 3 is connected. Here, a damping ratio decreases with increasing the frequency due to the loss factor of the series shunt circuit unit 3 shown in FIG. 6. In the embodiment of the present invention, a value of 5 ohm is used as the resistance of the resistor 5 and a capacitance of 200 nF is used as the negative capacitance 4.

Figure 8:
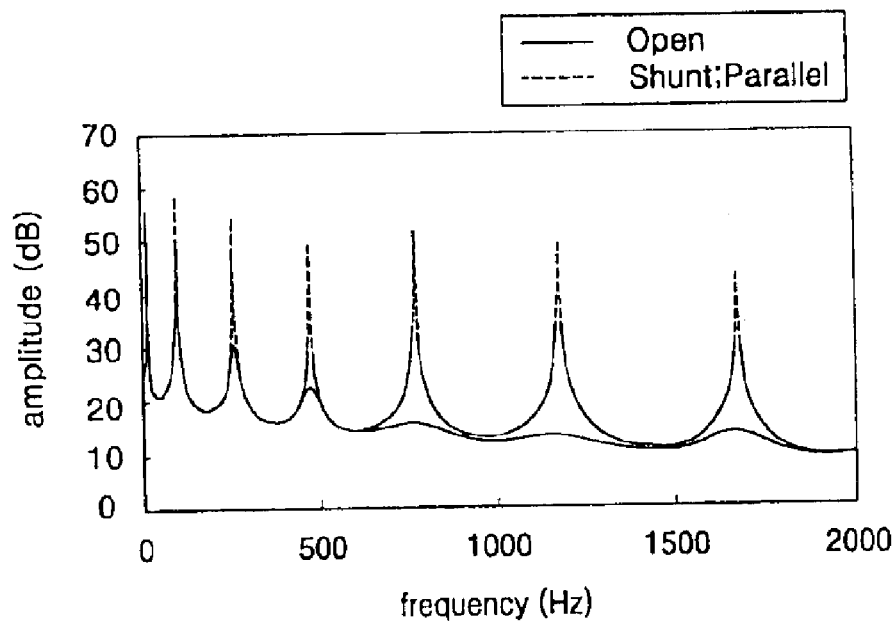
FIG. 8 is a graph illustrating a frequency response function when a parallel shunt circuit unit according to the present invention is operated and not operated.

FIG. 8 is a graph illustrating a frequency response function for the piezoelectric material/beam system to which the parallel negative capacitance shunt circuit unit 3' is connected. Here, the vibration amplitude decreases as the frequency band increases, which is opposite to the case of the series shunt circuit unit 3, due to the loss factor of the parallel negative capacitance shunt circuit unit 3' shown in FIG. 6. In the embodiment of the present invention, a value of 200 ohm is used as the resistance of the resistor 5' and a capacitance of 200 nF is used as the negative capacitance 4'.

Figure 9:
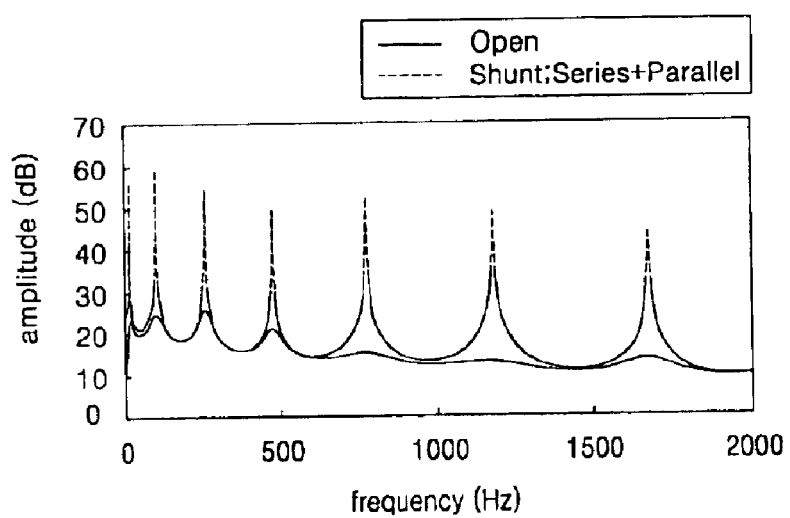
FIG. 9 is a graph illustrating a frequency response function when both parallel and series shunt circuit units according to the present invention are operated and not operated.

FIG. 9 is a graph illustrating a frequency response function to the piezoelectric material/beam system to which the series and parallel shunt branch circuit units 3 and 3' are connected. When the values of the resistor and negative capacitor used are same as the ones described above, the vibration amplitudes are reduced more than 20 dB from the peak of open circuit over the whole frequency range. The vibration amplitudes can be more efficiently reduced by reducing the resistance value of the shunt resistor in the series shunt circuit unit 3 and increasing the resistance value of the shunt resistor in the parallel shunt circuit unit 3', which can be explained by considering the relationship between the loss factor and the non-dimensional frequency.

The multi-mode vibration damper using the negative capacitance shunt circuits according to the present invention can be formed into a simple structure and has small volume and weight, so the multi-mode vibration damper can reduce the vibration and/or noise without greatly affecting a system. Accordingly, both negative capacitance shunt branch circuit units 3 and 3' according to the present invention can be used as a multi-mode vibration damper in various fields of engineering.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A device for controlling the damping of vibration and/or noise from the vibrating structure or system using a series negative capacitance shunt circuit and a parallel negative capacitance shunt circuit, which are connected a resistor and a negative capacitor in series and in parallel, respectively, comprising:

a structure and a system, which generate vibration and noise due to mechanical energy, such as force, pressure, and stress;

piezoelectric materials attached to the structure, which generate electrical energy in response to stress due to the vibration and/or noise and are transformed when receiving a predetermined electric energy; and shunt circuit units, which are connected to the piezoelectric materials to feed back the electrical energy generated by the piezoelectric materials to the piezoelectric materials via the shunt impedance in order to induce the transformation of the piezoelectric materials.

2. The device of claim 1, wherein said piezoelectric materials comprise poly-vinylidene fluoride (PVDF), semicrystalline polymer film, lead zirconate titanate (PZT), and piezo stack, and so forth of which shapes are transformed when a voltage is applied, and which generate voltage when a force or stress is applied.

3. The device of claim 1, wherein said negative capacitor is substituted by a synthetic negative impedance circuit unit, which consists of an operational amplifier, a capacitor, and two resistors having resistances of (1-a)R and aR, the resistances, (1-a)R and aR, are in a inverse proportional relationship, and can be adjusted in order to match slight differently with the inherent capacitance of piezoelectric material for avoiding the circuit oscillations of a synthetic negative impedance circuit.

4. A method for controlling the damping of vibration and/or noise from the vibrating structure and system which generate vibration and noise due to mechanical energy, such as force, pressure, and stress, comprising the steps of:

a) attaching a piezoelectric material to the place in which has the highest strain energy of the vibrating structure or system; and b) operating a synthetic negative impedance circuit unit after connecting a series resistor-negative capacitor shunt circuit to the terminals of the piezoelectric material, wherein the piezoelectric material comprises at least one of poly-vinylidene fluoride (PVDF), semicrystalline polymer film, lead zirconate titanate (PZT), and piezo stack, and so forth of which shapes are transformed when a voltage is applied, and which generate voltage when a force or stress is applied.

5. A method for controlling the damping of vibration and/or noise from the vibrating structure and system which generate vibration and noise due to mechanical energy, such as force, pressure, and stress, comprising the steps of:

a) attaching each of two piezoelectric materials to the top and bottom or parallel of a place in which has the highest strain energy of the vibrating structure or system; and b) operating a synthetic negative impedance circuit unit after connecting a series resistor-negative capacitor shunt circuit to the terminals of a piezoelectric material and a parallel resistor-negative capacitor shunt circuit to the terminals of the other piezoelectric material, wherein each of said piezoelectric materials comprise at least one of poly-vinylidene fluoride (PVDF), semicrystalline polymer film, lead zirconate titanate (PZT), and piezo stack, and so forth of which shapes are transformed when a voltage is applied, and which generate voltage when a force or stress is applied.

* * * * *